United States Patent [19]

Ezaki et al.

[11] Patent Number: 5,978,176
[45] Date of Patent: Nov. 2, 1999

[54] MAGNETIC HEAD FOR A MAGNETIC DISK HAVING A SLIDER WITH INDENTED PORTIONS FOR PROVIDING HEAT DISSIPATION

[75] Inventors: Joichiro Ezaki; Noboru Yamanaka, both of Saku; Izumi Nomura, Tokyo, all of Japan

[73] Assignee: TDK Corporation, Tokyo, Japan

[21] Appl. No.: 08/954,121

[22] Filed: Oct. 20, 1997

[30] Foreign Application Priority Data

Apr. 11, 1997 [JP] Japan ................................ 9-094171

[51] Int. Cl.$^6$ ................................................ G11B 21/21
[52] U.S. Cl. ................................................ 360/103
[58] Field of Search ............................................ 360/103

[56] References Cited

U.S. PATENT DOCUMENTS

| | | | |
|---|---|---|---|
| 4,673,996 | 6/1987 | White | 360/103 |
| 4,734,803 | 3/1988 | Nishihira | 360/103 |
| 4,870,519 | 9/1989 | White | 360/103 |
| 4,894,740 | 1/1990 | Chhabra et al. | 360/103 |
| 5,062,017 | 10/1991 | Strom et al. | 360/103 |
| 5,452,166 | 9/1995 | Aylwin et al. | 360/126 |
| 5,475,553 | 12/1995 | Saliba | 360/122 |
| 5,574,606 | 11/1996 | Kimura | 360/122 |
| 5,675,453 | 10/1997 | Matsuzawa et al. | 360/103 |
| 5,687,045 | 11/1997 | Okai et al. | 360/122 |
| 5,717,551 | 2/1998 | Negishi et al. | 360/122 |
| 5,726,841 | 3/1998 | Tong et al. | 360/122 |
| 5,751,517 | 5/1998 | Agarwal | 360/103 |
| 5,822,153 | 10/1998 | Lairson et al. | 360/103 |
| 5,831,792 | 11/1998 | Ananth | 360/103 |
| 5,844,749 | 12/1998 | Sakai et al. | 360/103 |

FOREIGN PATENT DOCUMENTS

| | | |
|---|---|---|
| 57-122063 | 7/1982 | Japan . |
| 60-101781 | 6/1985 | Japan . |
| 61-278087 | 12/1986 | Japan . |
| 3-296907 | 12/1991 | Japan . |
| 4-356765 | 12/1992 | Japan . |
| 4-366408 | 12/1992 | Japan ..................................... 360/126 |
| 5-266429 | 10/1993 | Japan . |
| 6-150278 | 5/1994 | Japan . |
| 7-1619 | 1/1995 | Japan . |
| 8-287444 | 11/1996 | Japan . |

*Primary Examiner*—Brian E. Miller
*Attorney, Agent, or Firm*—Oblon, Spivak, McClelland, Maier & Neustadt, P.C.

[57] ABSTRACT

The present invention is directed to provide a magnetic head that is capable of effectively preventing TA noise.

A slider 1 is provided with air bearing surfaces 111 and 121. Electromagnetic conversion elements 2 and 3, which are provided toward the trailing edge TR of the slider 1, perform electromagnetic conversion at the air bearing surfaces 111 and 121. The slider 1 is provided with indented portions 114 and projecting portions 115 at the air bearing surfaces 111 and 121 where the electromagnetic conversion elements 2 and 3 are provided. The indented portions 114 are provided in the areas corresponding to the width W2 of the electromagnetic conversion elements 2 and 3 viewed in the direction of the track width further toward the trailing edge TR than the electromagnetic conversion elements 2 and 3. The projecting portions 115 are provided adjacent to the indented portions 114 further projecting out compared to the indented portions 114.

4 Claims, 10 Drawing Sheets

MAGNETIC HEAD FOR A MAGNETIC DISK HAVING A SLIDER WITH INDENTED PORTIONS FOR PROVIDING HEAT DISSIPATION

BACKGROUND OF THE INVENTION

1. Field of the Invention

The present invention relates to a flying type magnetic head employed in a magnetic disk apparatus.

2. Discussion of Background

It is required of a flying type magnetic head employed in a magnetic disk apparatus in recent years that, in order to achieve high density recording/reproduction, the flying height at the electromagnetic conversion elements be reduced to, for instance, 20nm or less. In addition, magnetic heads that employ magnetoresistive elements (hereafter referred to as MR elements) capable of achieving high reproduction output without being dependent upon the relative speed between the magnetic disk and the magnetic head as their reproduction element have been put into practical use.

With this type of magnetic head, since it operates at an extremely small flying height, it is inevitable that it will at times come in contact with minute irregularities at the surface of the magnetic disk.

In a magnetic head employing an MR element for reproduction, noise is generated at the MR element when the magnetic head touches the minute irregularities at the surface of the magnetic disk due to the heat generated by the contact. This type of noise is referred to as thermal asperity (hereafter referred to as TA) noise among persons skilled in the field.

As a means for preventing TA noise, Japanese Unexamined Patent Publication (KOKAI) No. 287444/1996 discloses a technology whereby the MR element is made to operate at a distance from the air bearing surface (hereafter referred to as ABS). Apart from this, means for correcting TA noise by an electrical circuit and the like are also known.

However, if the MR element is made to operate at a distance from the ABS, a reduction in the reproduction sensitivity of the MR element will result. In addition, even if a method of compensating for the TA noise through an electrical circuit is employed, it is technically difficult to compensate for all TA noise through such a circuit.

In order to avoid the generation of TA noise, the flying height of the magnetic head must be set large to ensure that the magnetic head does not come in contact with the minute irregularities on the magnetic disk, which makes it impossible to respond to the need for high density recording that may be achieved through lower flying height.

SUMMARY OF THE INVENTION

It is an object of the present invention to provide a magnetic head capable of effectively preventing TA noise.

It is a further object of the present invention to provide a magnetic head capable of preventing TA noise without causing a reduction in the reproduction sensitivity of the MR element.

In order to achieve the objects described above, the magnetic head according to the present invention comprises a slider and one or more electromagnetic conversion elements. The slider is provided with an ABS. The electromagnetic conversion elements, which are provided at the trailing edge of the slider, perform electromagnetic conversion at the ABS.

The slider has one or more indented portions and projecting portions at the ABS where the electromagnetic conversion elements are provided. The indented portions are provided toward the trailing edge relative to the electromagnetic conversion elements in areas that correspond to the widths of the electromagnetic conversion elements in the direction of the track width. The projecting portions, two of which are provided adjacent to each of the indented portions, project out further than the indented portions.

As explained above, in the magnetic head according to the present invention, the electromagnetic conversion elements are provided toward the trailing edge of the slider. Normally, when a magnetic head is utilized in combination with a magnetic disk, its flying height is at its smallest at the trailing edge. Consequently, high density recording becomes possible.

The slider is provided with the indented portions and the projecting portions at-the ABS where the electromagnetic conversion elements are provided, with the indented portions located further toward the trailing edge than the electromagnetic conversion elements and the projecting portions projecting further out compared to the indented portions. As a result, when the magnetic head according to the present invention is employed in a magnetic recording/reproduction apparatus, the projecting portions of the magnetic head come in contact with the minute irregularities at the surface of the magnetic disk at the trailing edge, thereby preventing the indented portions from coming into contact with the minute irregularities at the magnetic disk.

Furthermore, since the indented portions are provided in an area corresponding to the width of the electromagnetic conversion elements in the direction of the track width and the projecting portions are provided adjacent to the indented portions, the projecting portions, which come in contact with the magnetic disk, are located away from the electromagnetic conversion elements in the direction of the track width. Thus, cooling and heat discharge of the heat generated when the projecting portions come in contact with the minute irregularities present at the surface of the magnetic disk, are enhanced. Therefore, when the electromagnetic conversion elements are constituted of MR elements, generation of TA noise at the MR elements is prevented.

Furthermore, since the electromagnetic conversion elements perform electromagnetic conversion at the ABS outside the indented portions, no reduction in the reproduction sensitivity occurs, due to the presence of the indented portions when the electromagnetic conversion elements are constituted of an MR element.

BRIEF DESCRIPTION OF THE DRAWINGS

More specific features and advantages of the present invention are explained in further detail in reference to the drawings, wherein.

DETAILED DESCRIPTION OF THE PREFERRED EMBODIMENTS

Figure 1:
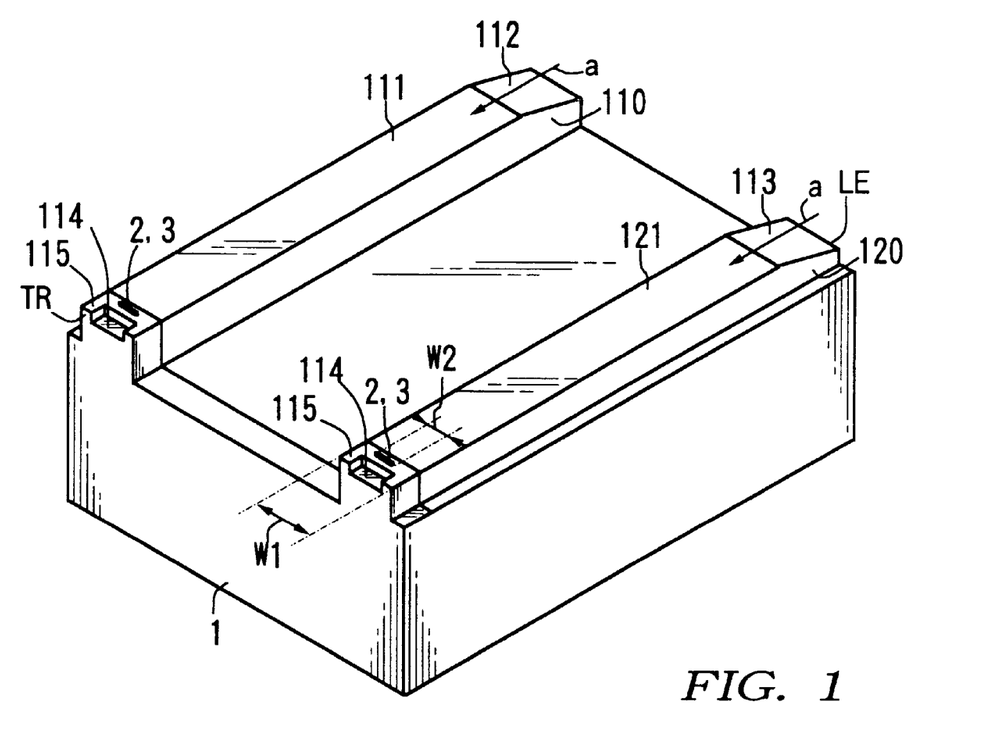
FIG. 1 is a perspective view of the magnetic head of the present invention.
Figure 2:
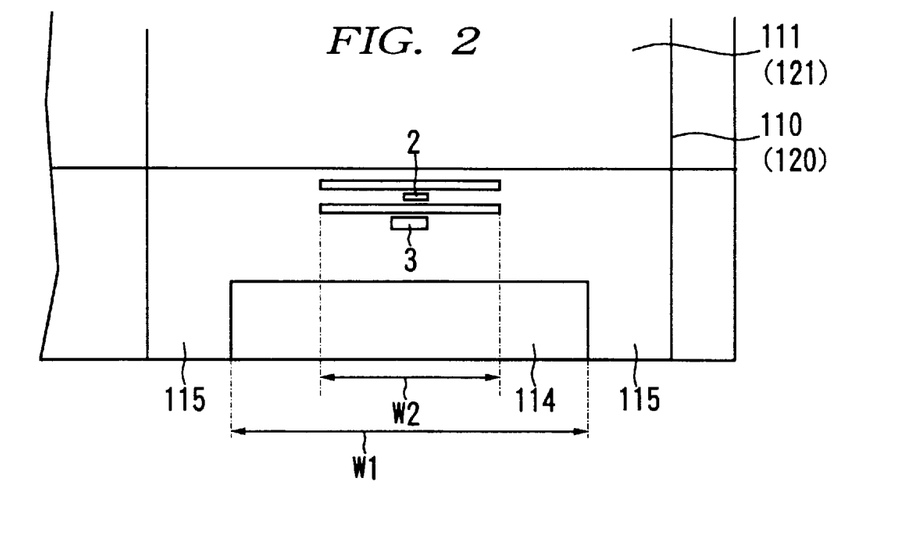
FIG. 2 is an enlarged plan view of the magnetic head in FIG. 1 showing the surface facing opposite the medium.
Figure 3:
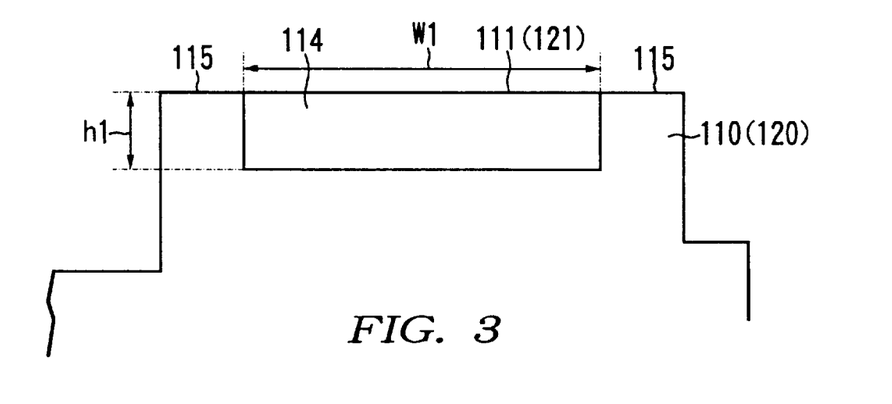
FIG. 3 is a side elevation of the magnetic head in FIG. 2 showing the trailing edge.

In reference to FIGS. 1 to 3 the magnetic head according to the present invention comprises a slider 1 and at least one electromagnetic conversion element 2 or 3. In this embodiment, the magnetic head includes an electromagnetic conversion element for reproduction 2 and an electromagnetic conversion element for recording 3. The slider 1 is provided with ABS 111 and 121. In the embodiment, the slider 1 is provided with two rails 110 and 120 provided facing opposite each other over a distance at the surface facing opposite the medium, and the surfaces of the rails 110 and 120 constitute the ABS 111 and 121. Tapered portions 112 and 113 are provided at the rails 110 and 120 respectively toward the leading edge LE. This type of slider 1 is referred to as a tapered-flat type slider. According to the present invention, a number of other types of sliders may be employed besides the tapered-flat type slider 1 in the embodiment. For instance, any one of the negative pressure sliders disclosed in Japanese Examined Patent Publication No. 1619/1995 and U.S. Pat. No. 4, 734,803, sliders with ABS having a specific contour such as those disclosed in Japanese Unexamined Patent (KOKAI) Publication No. 101781/1985 and Japanese Unexamined Patent (KOKAI) Publication No. 356765/1992, TPC (Transverse Pressurization Contour) sliders such as those disclosed in Japanese Unexamined Patent Publication (KOKAI) No. 278087/1986, Japanese Unexamined Utility Model Publication No. 122063/1982, U.S. Pat. No. 4,673,996 and U.S. Pat. No. 4,870,519 and the like may be employed.

The electromagnetic conversion elements 2 and 3 are provided toward the trailing edge TR of the slider 1, and electromagnetic conversion is performed at the ABS 111 and 121.

The slider 1 is provided with an indented portion 114 and projecting portions 115 at each of the ABS 111 and 121 where the electromagnetic conversion elements 2 and 3 are provided. The indented portions 114 are each provided toward the trailing edge TR relative to the electromagnetic conversion elements 2 and 3, in the area corresponding to the width W2 of the electromagnetic conversion elements 2 and 3 in the direction of the track width. More specifically, it is desirable to form the indented portions 114 so that they have a width W1 which is slightly larger than the width W2 of the electromagnetic conversion elements 2 and 3. The projecting portions 115 are provided adjacent to each indented portion 114, projecting further out than the indented portion 114.

In the embodiment, the indented portions 114 are constituted of indentations formed at the ABS 111 and 121 and the projecting portions 115 are constituted of the remaining ABS after the indentations constituting the indented portions 114 are formed. The indented portions 114 are formed so that a projecting portion 115 remains at both sides of each. The depth h1 of the indented portions 114, i.e. the height h1 of the projecting portions 115, is set at a value which ensures that when the projecting portions 115 are in contact with a magnetic disk, the minute irregularities of the magnetic disk do not come in contact with the indented portions 114 located at the front surfaces of the electromagnetic conversion elements 2 and 3 or the staged portions via the indented portions 114, i.e. at approximately 0.2 to 1 $\mu$m, for instance. The width W1 of the indented portions 114 in the direction of the track width is set at approximately 50 $\mu$m (see FIGS. 2 and 3). However, it should be noted that these values are given by way of example only.

Figure 4:
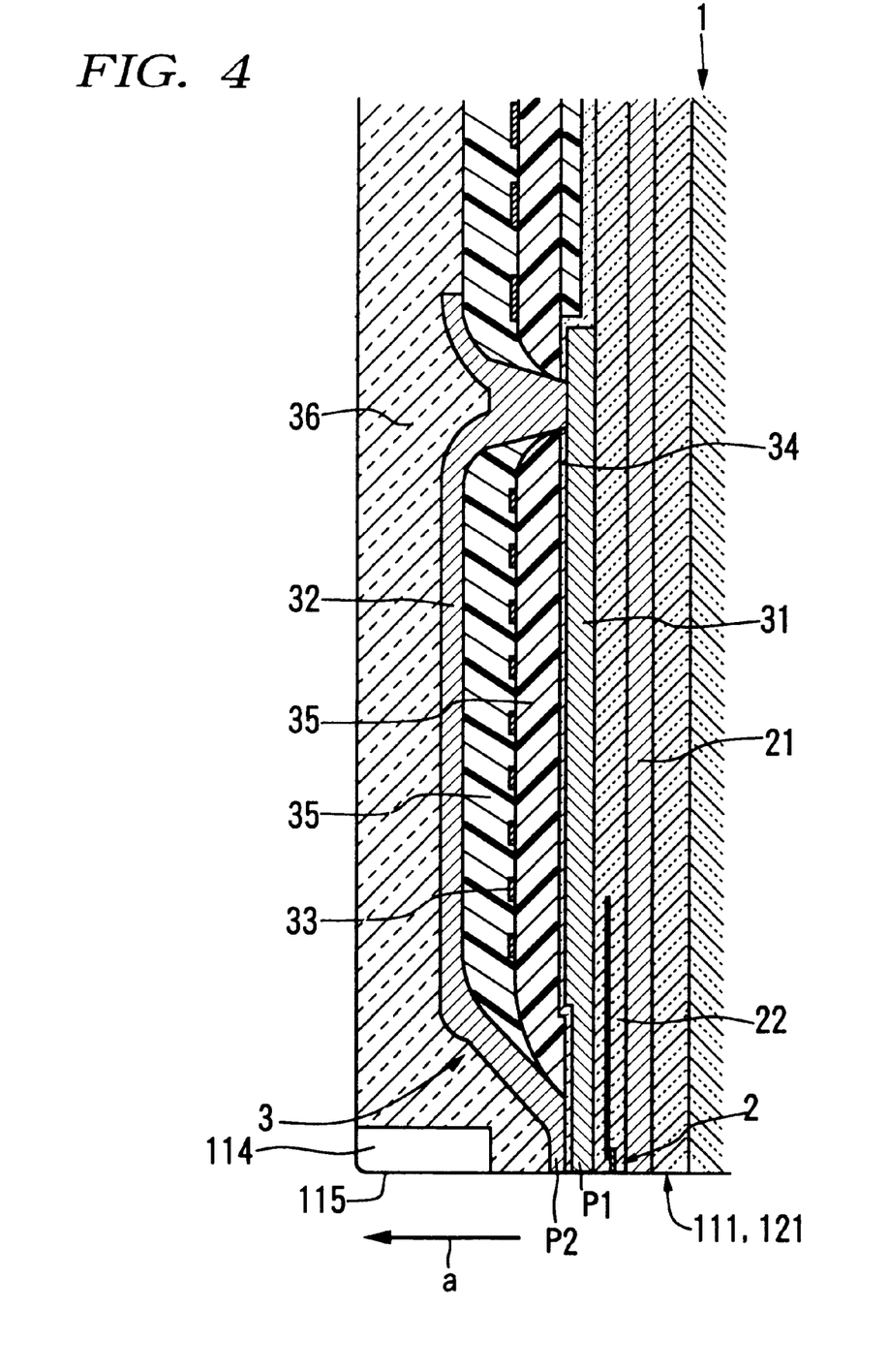
FIG. 4 is an enlarged cross section of the electromagnetic conversion elements in the magnetic head shown in FIGS. 1 to 3.

In reference to FIG. 4 the inductive magnetic conversion element 3 which constitutes the recording element is provided with a lower magnetic film 31 that also functions as an upper shield film for the electromagnetic conversion element 2 constituted of an MR element, an upper magnetic film 32, a coil film 33, a gap film 34 constituted of alumina or the like, an insulating film 35 constituted of an organic resin such as Novolak® and a protective film 36 constituted of alumina or the like. The front end portions of the lower magnetic film 31 and the upper magnetic film 32 constitute a lower pole tip P1 and an upper pole tip P2 respectively, which face opposite each other across the gap film 34 with a very small thickness. Write is performed at the lower pole tip P1 and the upper pole tip P2. The yokes of the lower magnetic film 31 and the upper magnetic film 32 are linked to each other so that they complete a magnetic circuit at a back-gap portion located at the opposite side from the lower pole tip P1 and the upper pole tip P2. The coil film 33 is formed on the insulating film 35 winding around the linking area of the yoke in a coil. The number of turns and the number of layers of the coil film 33 are arbitrary.

Various film structures have been proposed and put into practical use to achieve the electromagnetic conversion element 2 constituted of an MR element. They include structures that employ an anisotropic magnetoresistive effect element constituted of permalloy or the like and structures employing a giant magnetoresistive effect film. Any of these MR elements may be employed in the present invention. The electromagnetic conversion element 2 constituted of an MR element is provided inside an insulating film 22 between a lower shield film 21 and the lower magnetic film 31, which also functions as an upper shield film. The insulating film 22 is constituted of alumina or the like.

Figure 5:
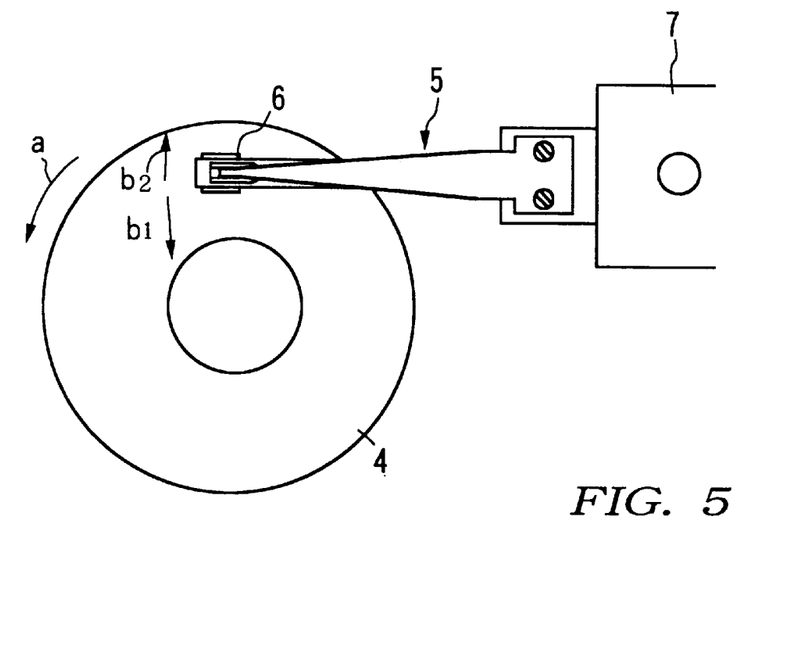
FIG. 5 shows a magnetic recording/reproduction apparatus employing the magnetic head of the present invention.

The magnetic recording/reproduction apparatus in FIG. 5 includes a magnetic disk 4, a head suspension 5 of the known art, a magnetic head 6 according to the present invention and a positioning device 7. The magnetic disk 4 is driven to rotate in the direction indicated with the arrow (a) by a rotating drive mechanism (not shown). The positioning device 7, which employs the rotary actuator system, supports one end of the head suspension 5. The magnetic head 6 is mounted at the free end of the head suspension 5 so as to allow it both pitch and roll movement and to allow a load to be applied toward the surface of the magnetic disk 4.

Figure 6:
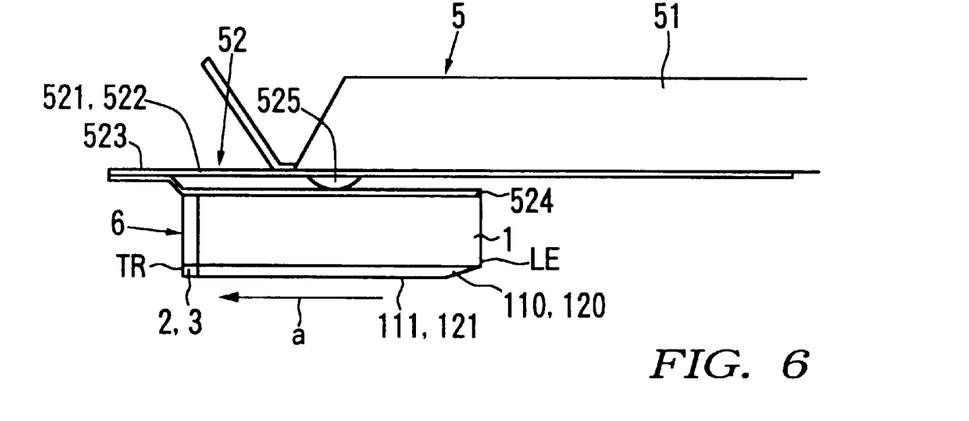
FIG. 6 is a side elevation of the magnetic head device.
Figure 7:
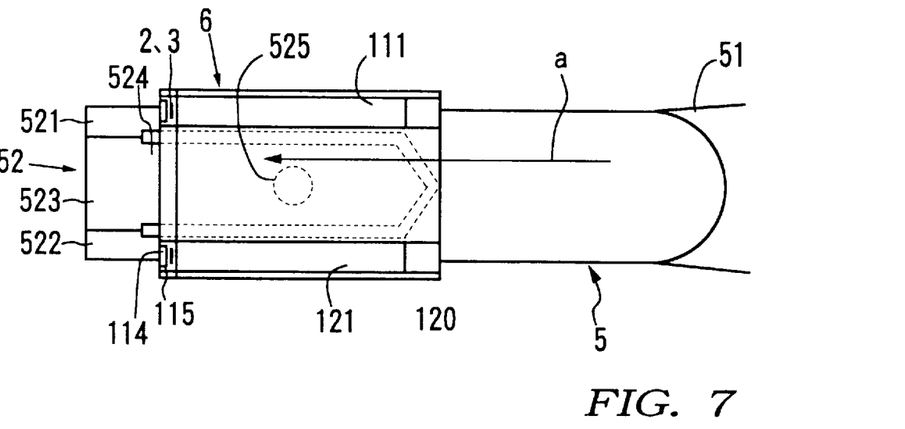
FIG. 7 shows the magnetic head device in FIG. 6 showing the side facing opposite the medium.

In reference to FIGS. 6 and 7 the head suspension 5 is constituted by adopting a structure in which a flexible body 52 constituted of thin metal plate is mounted at the free end at one end of a supporting body 51 in its lengthwise direction, which is also constituted of thin metal plate, with the magnetic head 6 mounted at the lower surface of the flexible body 52. The head suspension 5 applies a load force which presses the magnetic head 6 toward the magnetic disk 4. The flexible body 52 in the figures is provided with two external frame portions 521 and 522 that extend almost parallel to the axis of the supporting body 51 in its lengthwise direction, a lateral frame 523 that links the external frame portions 521 and 522 at the end distanced from the supporting body 51 and a tongue piece 524 that extends from approximately the center of the lateral frame 523 almost parallel to the external frame portions 521 and 522 with its front end being a free end. One end, which is at the opposite side from the direction in which the lateral frame 523 is provided is mounted in the vicinity of the free end of the supporting body 51 by means such as welding.

A loading protrusion 525, which may be, for instance, a semi-spherical shape, is provided at the lower surface of the supporting body 51. With this loading protrusion 525, a load force is communicated from the free end of the supporting body 51 to the tongue piece 524.

The magnetic head 6 is mounted to the lower surface of the tongue piece 524 by means such as adhesion. The magnetic head 6 is mounted at the magnetic head suspension 5 in such a manner that its lengthwise direction matches the lengthwise direction of the head suspension 5. The head suspension 5 that is adopted in the present invention is not restricted to that employed in the embodiment described above. Selection may be made from a wide variety of head suspensions that have been disclosed previously or that may be proposed in the future. For instance, the supporting body 51 and the tongue piece 524 may be integrated by utilizing a flexible macromolecular patch such as a tab tape.

Figure 8:
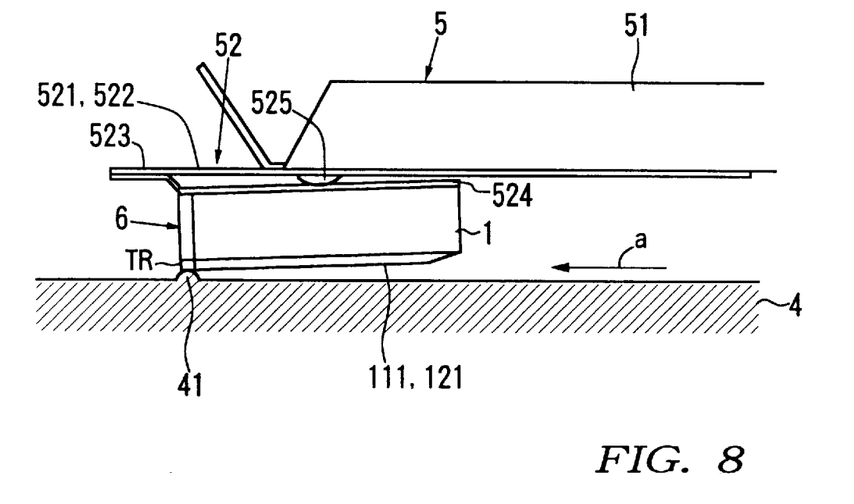
FIG. 8 shows the flying state of the magnetic head in the magnetic recording/reproduction apparatus shown in FIG. 5.
Figure 9:
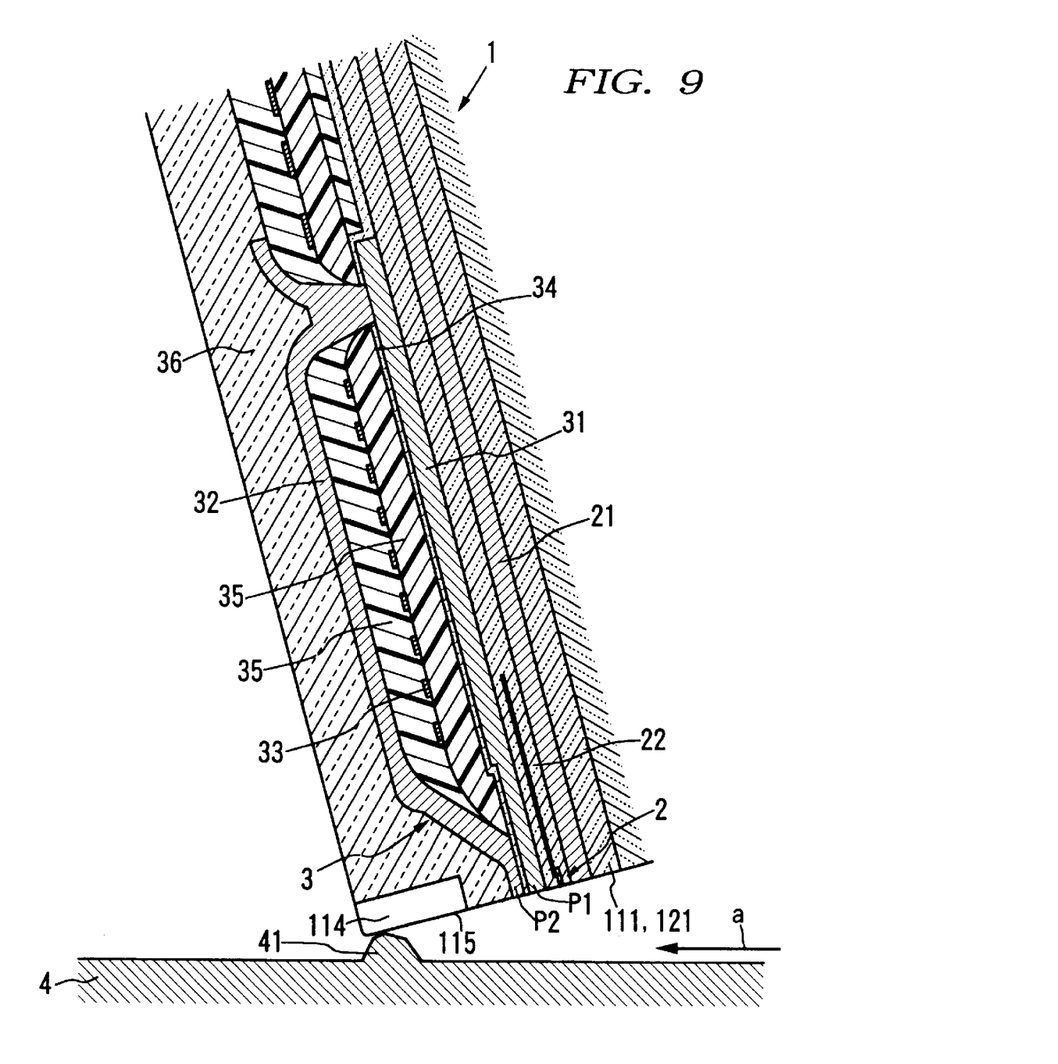
FIG. 9 is an enlarged cross section illustrating the flying state of the magnetic head shown in FIG. 8.

During read/write operations performed by the magnetic recording/reproduction apparatus shown in FIG. 5, the magnetic head 6 is driven in the direction indicated with the arrow b1 or b2 at a specific angle (skew angle) on a plane parallel to that of the magnetic disk 4 by the head suspension 5 and the positioning device 7. Thus, a write-to or read-from the magnetic disk 4 is performed at a specific track. As illustrated in FIG. 8 and also illustrated in FIG. 9 in an enlargement, the magnetic head 6 flies at a pitch angle of, for instance, several tens of $\mu$ (rad) relative to the trailing edge TR due to the flying force applied by the air flowing into the leading edge LE in the direction indicated with the arrow (a).

In the magnetic head according to the present invention, the electromagnetic conversion elements 2 and 3 are provided toward the trailing edge TR of the slider to perform electromagnetic conversion at the ABS 111 and 121. Consequently, high density recording is achieved.

Now, in the normal flying attitude illustrated in FIG. 8, the portion that comes in contact with the magnetic disk 4 most readily is the edge portion at the trailing edge TR of the slider 1. According to the present invention, the slider 1 is provided with the indented portions 114 and the projecting portions 115 at the ABS 111 and 121 where the electromagnetic conversion elements 2 and 3 are provided. The indented portions 114 are provided further toward the trailing edge TR than the electromagnetic conversion elements 2 and 3 whereas the projecting portions 115 are provided adjacent to the indented portions 114 projecting out further compared to the indented portions 114. As a result, when the magnetic head 6 according to the present invention is employed in a magnetic recording/reproduction apparatus (see FIG. 5) the projecting portions 115 come in contact with the minute irregularities 41 at the magnetic disk 4 toward the trailing edge TR, thereby preventing the indented portions 114 from coming into contact with the minute irregularities 41 at the magnetic disk 4.

Furthermore, since the indented portions 114 are provided in areas corresponding to the width W2 of the electromagnetic conversion elements 2 and 3 in the direction of the track width and the projecting portions 115 are provided adjacent to the indented portions 114, the projecting portions 115 that come in contact with the magnetic disk 4 are located further away from the electromagnetic conversion elements 2 and 3 in the direction of the track width. Thus, cooling and discharge of the heat generated when the projecting portions 115 come in contact with the minute irregularities 41 present at the surface of the magnetic disk 4 increase, and when either the electromagnetic conversion element 2 or 3 is constituted of an MR element, generation of TA noise at the MR element is prevented.

Moreover, since the electromagnetic conversion elements 2 and 3 perform electromagnetic conversion at the ABS 111 and 121 outside the indented portions 114, no reduction in the reproduction sensitivity occurs due to the presence of the indented portions 114 when constituting the electromagnetic conversion element 2 or 3 with an MR element.

Figure 10:
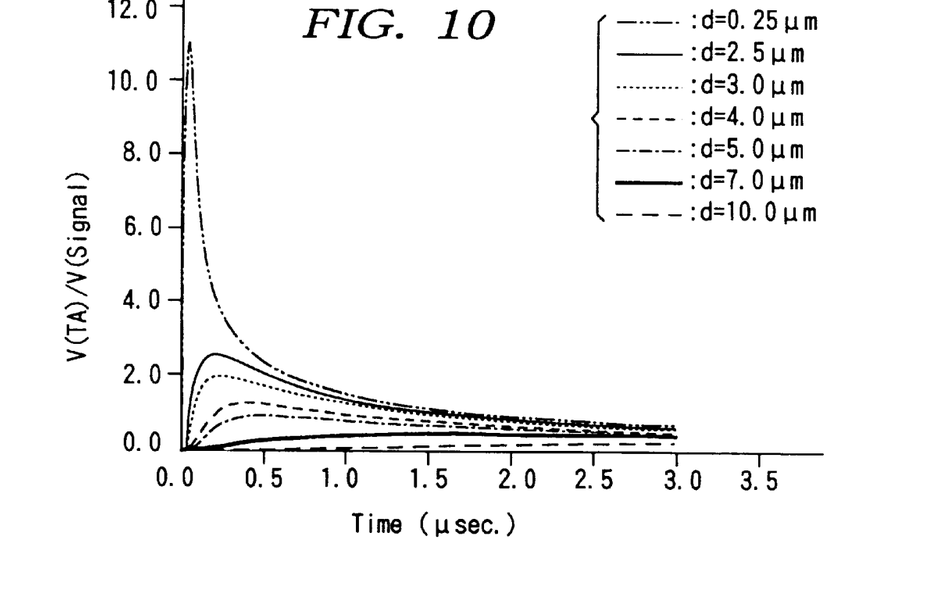
FIG. 10 shows the ratio of the TA output level against the original output of the magnetic head recorded over time.
Figure 11:
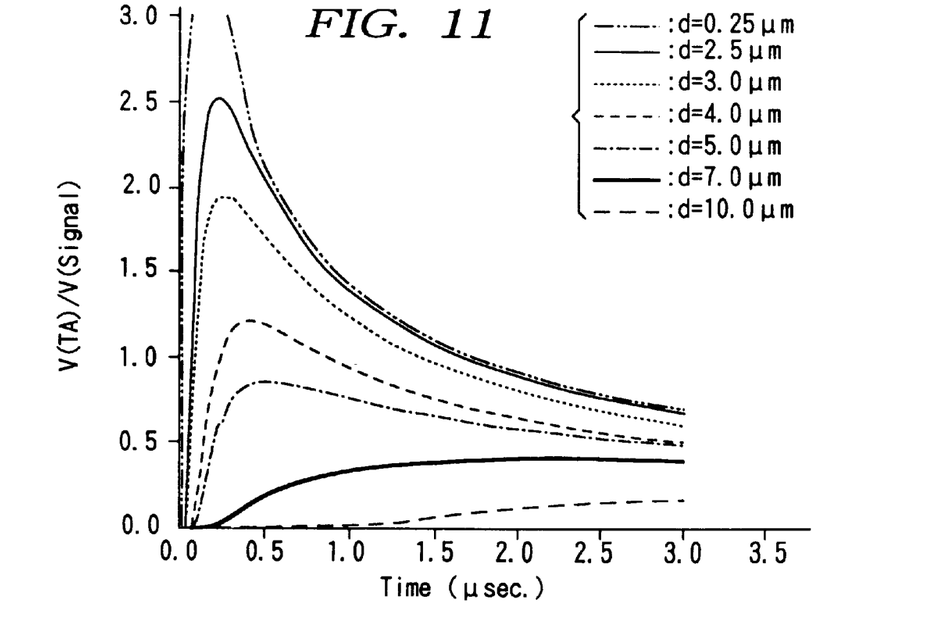
FIG. 11 is a partial enlargement of FIG. 10.

FIG. 10 presents data that indicate the change in the ratio of TA output V (tTA) relative to the original output V (signal) of the magnetic head, i.e. V (TA)/V (signal) that occurs over time, and FIG. 11 is a partial enlargement of FIG. 10. The reference (d) indicates the distance from the contact position to the edge of the MR element.

In reference to FIGS. 10 and 11, since the ratio V (TA)/V (signal) at 0.0 $\mu$sec immediately after the slider and the magnetic disk come in contact becomes smaller as the distance (d) from the contact point to the edge of the MR elements increases, the larger the distance (d), the better. However, since the distance (d) is related to the thickness of the protective films protecting the electromagnetic conversion elements 2 and 3, there is a limit to the maximum value that may be selected According to the data presented in FIGS. 10 and 11, the ratio V (TA)/V (signal) is at approximately 1 in the vicinity where the distance (d)=5.0 $\mu$m. TA noise can be inhibited through an electric circuit within this range. Consequently, the width W1 of the indented portions 114 and the positions of the projecting portions 115 should be set so that the distance (d) is approximately 5 $\mu$m.

Figure 12:
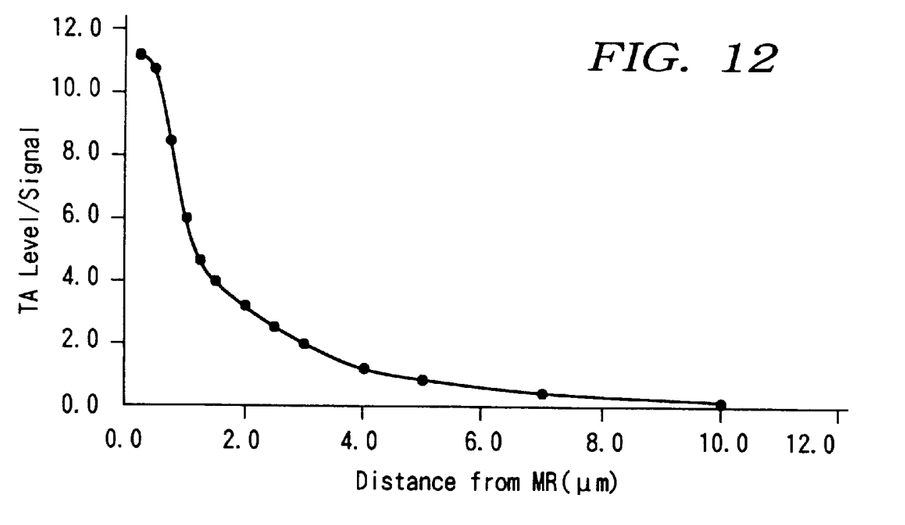
FIG. 12 shows the relationship between the level of TA noise and the generation position.
Figure 13:
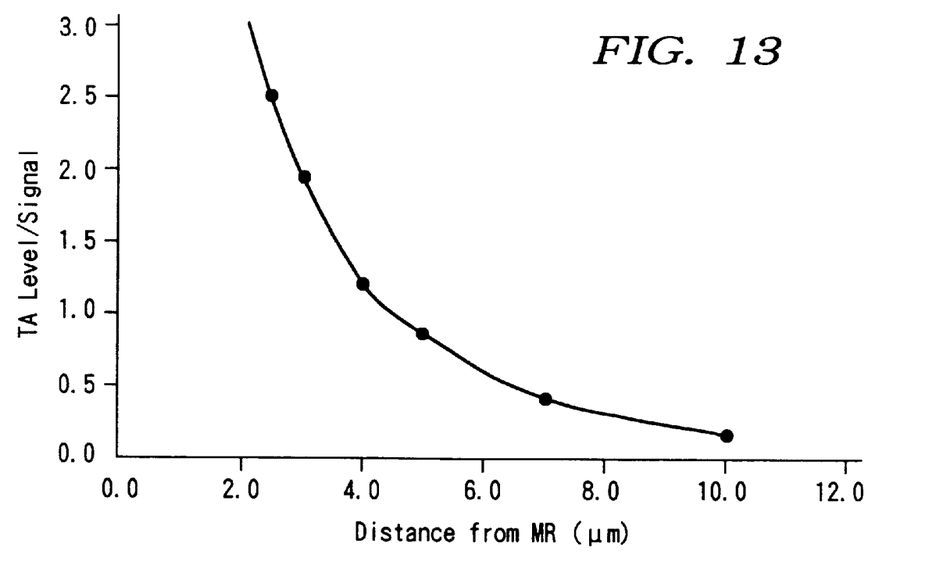
FIG. 13 is a partial enlargement of FIG. 12.

FIG. 12 presents data indicating the relationship between the maximum value of the ratio of the TA noise against the original output (signal) of the magnetic head (TA noise/signal) and the distance (d), and FIG. 13 is a partial enlargement of FIG. 12. While it is obvious from FIGS. 12 and 13 that the maximum value of the ratio (TA noise/signal) becomes larger as the distance (d) decreases, the ratio (TA noise/signal) achieves a value of approximately 1 which can be compensated for through an electric circuit in the vicinity where the distance (d)=5.0 $\mu$m.

Figure 14:
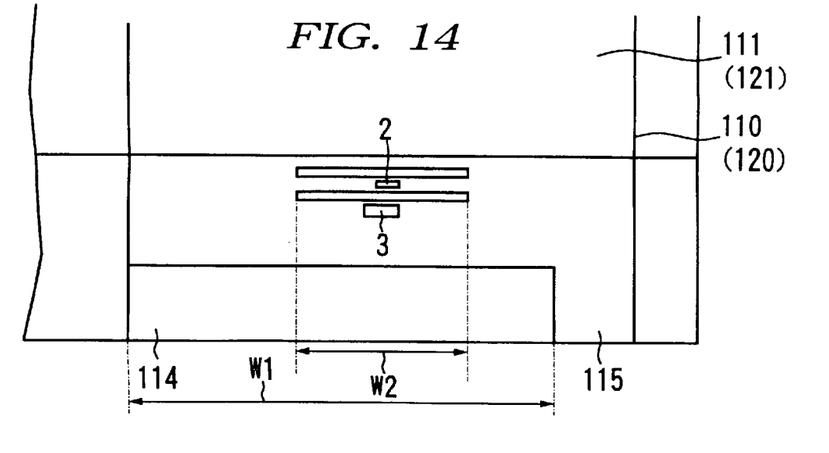
FIG. 14 shows another embodiment of the magnetic head of the present invention showing the side facing opposite the medium.
Figure 15:
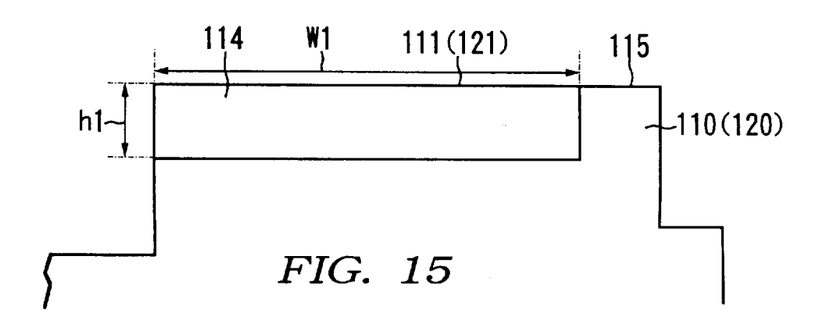
FIG. 15 shows the magnetic head in FIG. 14 showing the trailing edge.

FIG. 14 is another embodiment of the magnetic head according to the present invention showing the surface facing opposite the medium and FIG. 15 shows the trailing edge TR of the magnetic head in FIG. 14. In this embodiment, the internal ends of the indented portions 114 in the direction of the track width are left open. In this embodiment, the projecting portions 115 provided at the external ends in the direction of the track width come in contact with the minute irregularities 41 at the magnetic disk 4, thereby ensuring that the indented portions 114 do not come in contact with the minute irregularities 41 at the magnetic disk 4 (see FIGS. 8 and 9). Moreover, since the heat generated when the projecting portions 115 come in contact with the minute irregularities 41 at the surface of the magnetic disk 4 travels through an expanded path extending from the projecting portions 115 through the indented portions 114 reaching the electromagnetic conversion elements 2 and 3, the cooling effect and the dispersion of the heat are enhanced. Thus, when the electromagnetic conversion element 2 is constituted of an MR element, generation of TA noise is prevented.

Furthermore, since the electromagnetic conversion elements 2 and 3 perform electromagnetic conversion at the ABS 111 and 121 outside the indented portions 114, no reduction in the reproduction sensitivity occurs due to the presence of the indented portions 114 when constituting the electromagnetic conversion elements 2 and 3 with MR elements.

Figure 16:
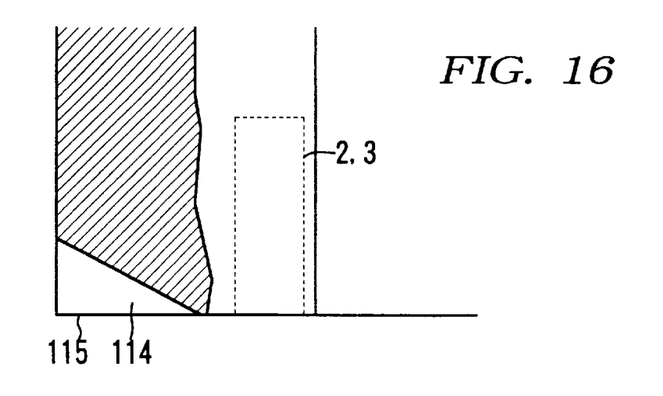
FIG. 16 is a partial cross sectional side elevation illustrating yet another embodiment of the magnetic head of the present invention.

FIG. 16 is a partial cross sectional side elevation illustrating yet another embodiment of the magnetic head according to the present invention. In this embodiment, the bottom surface of the indented portions 114 is an inclined surface. As has already been explained, the projecting portions 115 are provided adjacent to the indented portions 114 projecting further out than the indented portions 114. In this embodiment, too, advantages similar to those achieved by the previous embodiments are achieved.

Figure 17:
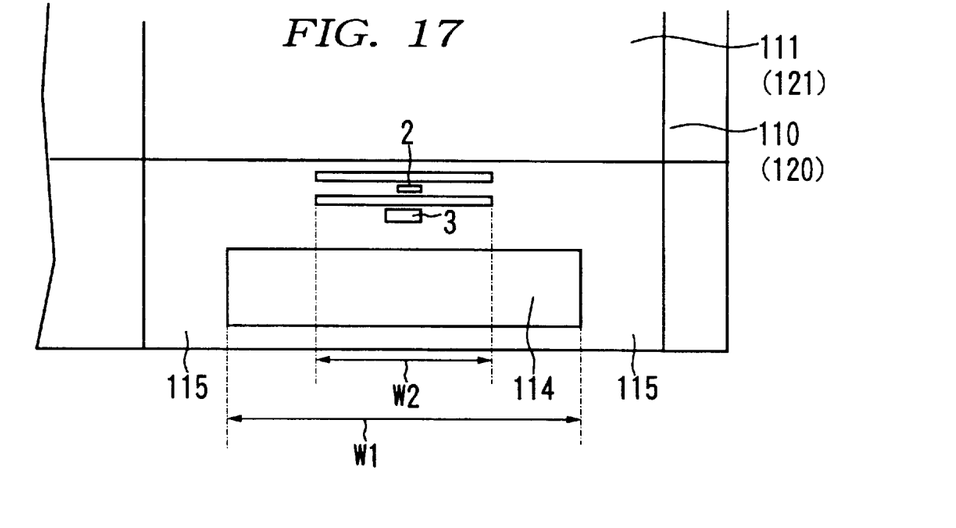
FIG. 17 shows another embodiment of the magnetic head of the present invention showing the side facing opposite the medium.
Figure 18:
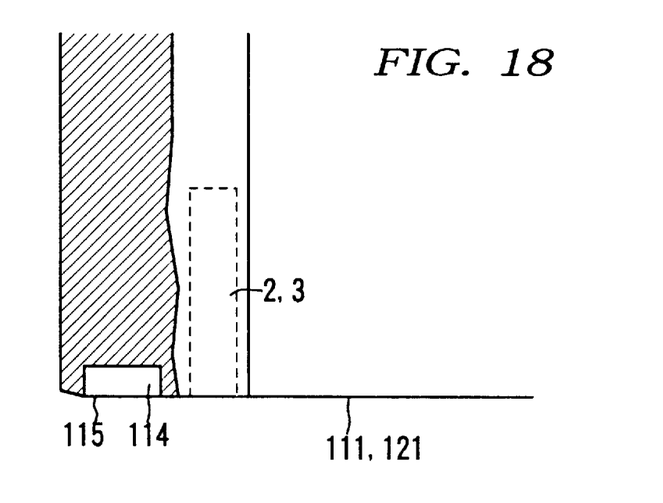
FIG. 18 is a partial cross sectional side elevation of the magnetic head shown in FIG. 17.

FIG. 17 is yet another embodiment of the magnetic head according to the present invention showing the side facing opposite the medium and FIG. 18 shows the trailing edge TR of the magnetic head in FIG. 17. In this embodiment, the indented portions 114 are formed with their peripheral sides surrounded by the ABS 111 and 121. The ABS 111 and 121 surrounding the indented portions 114 constitute the projecting portions 115. In this embodiment, the end edges of the projecting portions 115 constitute the trailing edge TR over the entire width of the rails 110 and 120, and come in contact with the minute irregularities 41 at the surface of the magnetic disk 4. The indented portions 114 are present between the end edges of the projecting portions 115 and the electromagnetic conversion elements 2 and 3 extend the distance from the end edges of the projecting portions 115 to the electromagnetic conversion elements 2 and 3, achieving both a cooling effect and a heat dispersion effect, thereby preventing generation of TA noise.

While the present invention has been explained in detail in reference to specific preferred embodiments, it is obvious to persons skilled in the field that a number of variations are possible in its form and detail without departing from the essence and scope of the present invention.

What is claimed is:

1. A magnetic head comprising:

a slider having an air bearing surface with one or more indented portions, each indented portion defining two projecting portions at the trailing edge of the slider; and one or more electromagnetic conversion elements having at least one upper pole tip, and provided substantially flush with said air bearing surface, a trailing edge of said at least one upper pole tip being a distance of at least 5 $\mu$m from a closest edge of said one or more indented portions, said one or more electromagnetic conversion elements provided separately from said one or more indented portions;

wherein said one or more indented portions are larger in width than a width of said one or more electromagnetic conversion elements in a direction of track width, said one or more indented portions provided on a trailing edge side of said one or more electromagnetic conversion elements;

said projecting portions forming part of the air bearing surface and wherein the one or more indented portions provide heat dissipation for the heat generated when the projecting portions come into contact with the disk or surface irregularities thereon.

2. A magnetic head according to claim 1, wherein:

said one or more electromagnetic conversion elements include a reproduction element utilizing the magnetoresistive effect.

3. A magnetic head according to claim 2, wherein:

said one or more electromagnetic conversion elements include a recording element utilizing electromagnetic induction.

4. A magnetic head according to claim 1, wherein at least one of said one or more indented portions is rectangular.

* * * * *